United States Patent [19]

Fuehrer et al.

[11] Patent Number: 4,805,490
[45] Date of Patent: Feb. 21, 1989

[54] VALVE AND CLOSURE ASSEMBLY FOR AN AUTOMATIC TRANSMISSION

[75] Inventors: Reece R. Fuehrer, Danville; Peter E. Swingler, Carmel, both of Ind.

[73] Assignee: General Motors Corporation, Detroit, Mich.

[21] Appl. No.: 29,057

[22] Filed: Mar. 23, 1987

[51] Int. Cl.[4] ........................ B60K 41/22; F16H 57/02
[52] U.S. Cl. ..................................... 74/867; 74/606 R
[58] Field of Search ................. 74/606 R, 843, 752 D, 74/867, 868, 866; 137/884

[56] References Cited

U.S. PATENT DOCUMENTS

| | | | |
|---|---|---|---|
| 3,216,280 | 11/1965 | Astberg | 74/867 |
| 3,721,136 | 3/1973 | Irie | 74/752 D |
| 3,726,159 | 4/1973 | Mizote | 74/752 D |
| 4,083,266 | 4/1978 | Kreitzberg | 74/606 R |
| 4,226,200 | 10/1980 | Morisawa et al. | 74/606 R |
| 4,261,227 | 4/1981 | Yamamori et al. | 74/606 R |
| 4,444,073 | 4/1984 | Moroto et al. | 74/869 X |
| 4,449,426 | 5/1984 | Younger | 74/843 |
| 4,679,450 | 7/1987 | Hayakawa et al. | 74/868 X |
| 4,693,143 | 9/1987 | Harada et al. | 74/866 |

FOREIGN PATENT DOCUMENTS 0241575 11/1985 Japan ........................ 74/606 R Primary Examiner—Dwight G. Diehl
Assistant Examiner—David Novais
Attorney, Agent, or Firm—Donald F. Scherer

[57] ABSTRACT

A valve and closure assembly has a cover plate which attaches to a transmission housing to close the interior housing from atmosphere. A separator plate and a plurality of fluid valve assemblies are secured to the cover plate and disposed within the transmission housing. Fluid passages in the cover plate interconnect the valve assemblies. Passages in the separator plate direct fluid to passages in the transmission housing at the interface of the cover plate and transmission housing for distribution within the transmission housing to components disposed therein. Electrical wiring for the solenoids and an electrical connector are disposed on the cover plate so that a single electrical interconnection with the transmission can be utilized. Filters for both high pressure control fluid and low pressure cooling and lube fluid are secured on the cover plate.

2 Claims, 1 Drawing Sheet

VALVE AND CLOSURE ASSEMBLY FOR AN AUTOMATIC TRANSMISSION

BACKGROUND OF THE INVENTION

This invention relates to valve assemblies and more particularly to valve assemblies for fluid-operated automatic transmissions.

In prior art transmissions, the interconnecting passages or worm tracks for the valving is formed in the transmission housing casting. This surface must be machined along with the remainder of the casting and must be maintained relatively flat to ensure against leakage when the valve body is secured thereto. If there is leakage between the worm tracks caused by porosity or insufficiency of material in the raw casting, the entire case casting must be scrapped.

When design improvements in the control valving occur which require changes in the worm tracks, the old design case must be scrapped or the use of the improvements is delayed until the old casings have been used.

SUMMARY OF THE INVENTION

The present invention seeks to overcome these drawbacks. With the present invention, all of the valving interconnecting passages are formed in a separate plate which is secured to the transmission housing as a cover or closure member. The fluid interconnections with the transmission components; i.e., clutches, brakes, fluid pumps, etc., are made by way of single passages formed at the coverhousing interface which is easily sealed by a conventional gasket.

If machining or casting errors occur at the worm tracks only, the plate only is scrapped. Since the fluid interconnection with the transmission components are made at the passages formed at the interface, the worm track pattern can be changed at any time and improvements can be retro-fitted to prior transmission designs, if desired. In any event, design improvements can reach the market place much quicker and with less expense.

As a further advance in the art, the fluid filters normally disposed on the pump inlet can be mounted directly on the plate prior to assembly with the transmission case, as can all of the wiring in the electrical plug connection for the electrical power and sensing elements used for transmission control. With the present invention, a compact, easy changeable and less expensive control plate and cover assembly is provided. Any valving improvements can be immediately incorporated into the production assembly with minimum changeover time and without changes to the transmission case or transmission components.

It is therefore and object of this invention to provide an improved transmission control assembly wherein a cover plate, removable from the transmission case, has mounted thereon the hydraulic control valve and electrical control components.

It is another object of this invention to provide an improved transmission control valve assembly wherein the fluid passages interconnecting the valves are formed in a cover plate on which the control valving is mounted, and wherein the control fluid is delivered to transmission components through openings formed at the interface between the cover plate and the transmission case.

It is still a further object of this invention to provide an improved transmission cover plate and control valve assembly wherein a modulator valve and cover plate assembly are assembled and can be tested prior to installation on a transmission and wherein the plate portion of the assembly serves as both a transfer plate and a cover for the transmission sump and further wherein fluid filters for the transmission fluid can be installed on the cover plate also prior to assembly.

These and other objects and advantages of the present invention will be more apparent from the following specification and drawings.

DESCRIPTION OF THE PREFERRED EMBODIMENT

Figure 1:
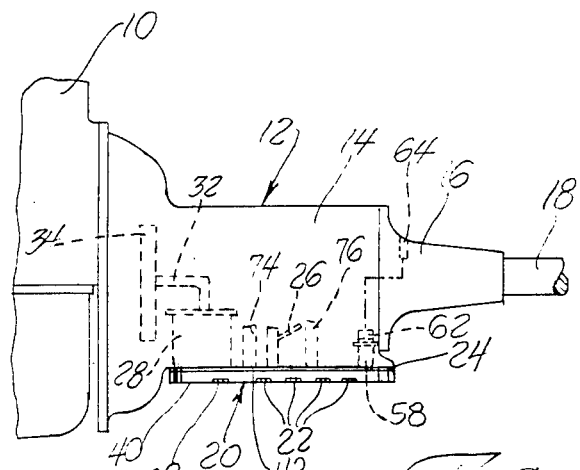
FIG. 1 is an elevational view of a transmission incorporating the present invention.

Referring to the drawings, wherein like characters represent the same or corresponding parts throughout the several views, there is seen in FIG. 1 a prime mover 10, which may be an internal combustion engine, a conventional automatically shifted transmission 12 which incorporates a transmission housing formed from a main housing 14 and an output housing 16. The output housing 16 rotatably supports a transmission shaft 18.

A valve and closure plate assembly generally designated 20, is secured to the main transmission housing 14 by a plurality of threaded fasteners 22. An interface 24 is formed between the assembly 20 and the housing 14. On the housing side of the interface 24, a plurality of passages, such as 26, are formed in the housing 14. These passages lead to various transmission components, such as clutches and brakes.

Figure 2:
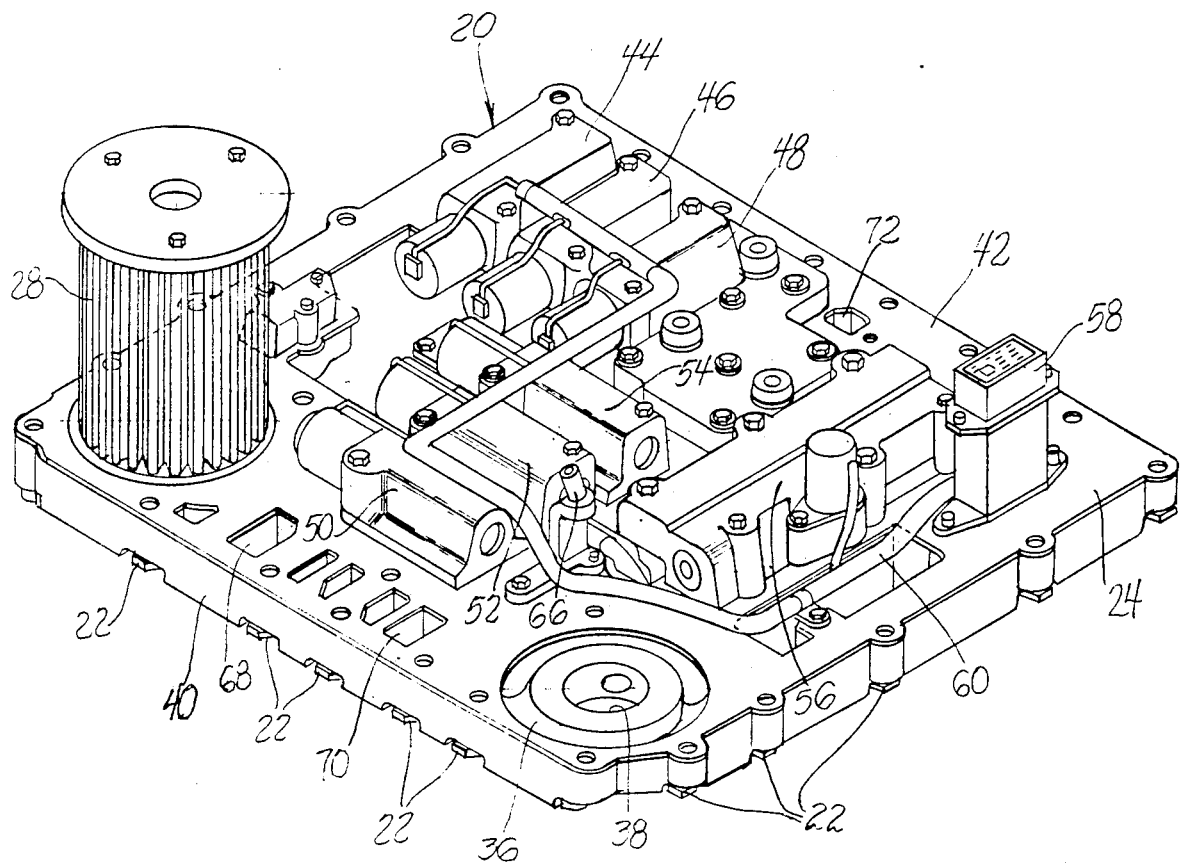
FIG. 2 is a perspective view of the cover plate and control assembly.

As seen in FIG. 2, a hydraulic fluid filter 28 is secured to the assembly 20. The filter 28 is fed by a passage 32 connected with a cavity, not shown, in the main housing 14. The cavity, which provides fluid flow to the full perimeter of the filter 28, is connected to a conventional hydraulic pump 34 which is disposed within the housing 14. The assembly 20 also has a second filter cavity 36 for accommodating a low pressure or lube and cooling filter, if desired. This filter has an outlet portion 38 through which fluid passes after entering the outer surface of the filter. The filter can be constructed similar to the filter 28.

The assembly 20 consists of a cover plate 40, a separator plate 42, a plurality of solenoid-operated control valve assemblies 44, 46, 48, 50, 52, 54 and 56. The assembly 20 further includes an electrical connector 58 and a wiring bundle 60 which connects the electrical connector 58 to the solenoids of each control valve. The electrical connector 58 is connected with an electrical connector 62 disposed within the transmission housing 14. The electrical connector is connected by wiring to a plurality of sensors, such as an output speed sensor 64.

If desired, an turbine speed sensor, such as 66, can be secured to the assembly 20 and connected through wiring with the connector 58. The connector 58 would also be connected with a conventional electronic control mechanism, such as a microprocessor, which would be programmed to provide proper shift points and fluid pressure control within the transmission. Other sensor mechanisms, such as engine torque, system pressure, operating temperature, etc., can also be utilized and the information obtained therefrom can be sent to the microprocessor.

The plate 40 has formed therein a plurality of tortuous paths or worm tracks (not shown) which communicate with the control valves 44 through 56 in a conventional well-known manner. The separator plate 42 controls which of the worm tracks is communicated to the individual valve assemblies. The fluid flow and pressure outputs from the control valves must be conducted to the various valve elements within the transmission 12 for controlling these elements.

As is well-known, these elements are comprised of fluid-operated clutches and fluid-operated brakes which are selectively engaged to establish ratios in conventional planetary gearing. The fluid flow and pressure established by the control valves is directed through passages, such as 68, 70 and 72, the interface 24 to passages, such as 74 and 76, formed in the transmission housing. These passages 68, 70 and 72 are protected from leakage to atmosphere by conventional gaskets.

As should be evident from viewing FIG. 2, the assembly 20 can easily be installed on a test fixture such that fluid pressure can be applied to the system and each of the valve elements can be tested as can the electrical system by a simple plug connection at connector 58. Any inordinate valve function or control function can be located prior to assembly on the transmission.

It also becomes a relatively simple task to provide various control levels by changing one or more of the valve assemblies 44 through 56. In order to change the entire control system where it becomes necessary to change the worm tracks or tortuous paths which are formed in the plate 40 only, the casting mold for the plate 40 would have to be changed and the stamping tools or dies for the separator plate 42 would have to be changed. Thus, complete control function changes can be made with relative ease and by accomplished inexpensively. Those familiar with the manufacture of automatic transmission will be aware of the expense involved in the changing of a transmission housing casting which must be modified in order to change existing worm track patterns which currently exist in automatic transmissions of this kind. This expense is greatly reduced with the present invention.

Another advantage which occurs with the present invention is transmission sump oil level control. In the current transmissions, some of the control valving may extend into the sump oil whenever the oil level is at or above the "Add" mark on the ullage rod. These components may vary in a volume of oil which they displace and therefor affect the oil level reading from transmission to transmission, thus necessitating individual calibration of ullage rods. With the present invention, all of the valving components will be below the fluid level whenever the fluid level is at the "Add" or above level. Thus, a sensitivity of the ullage rod to the oil level range between full and "Add" is removed.

As pointed out above, this invention permits modular installation or replacement of the control valve assembly and provides a single unit for mounting the control valves and closing the transmission housing from atmosphere.

The embodiments of the invention in which an exclusive property or privilege is claimed are defined as follows:

1. A valve and closure assembly for a transmission wherein the transmission includes a housing with an opening therein said housing enclosing a plurality of hydraulically controlled elements such as fluid-operated friction devices and having formed therein passages for distributing fluid to said friction devices and the transmission also including a plurality of electronic sensors such as speed sensors disposed in the housing, said valve and closure assembly comprising: closure plate means for providing the sole closing member of said opening in the housing; a plurality of fluid passages formed in said closure plate means; valve assembly means secured to said closure plate means and enclosing said fluid passages and including a plurality of valve means for controlling the flow of fluid in said passage means; solenoid means for operating said valve means including a plurality of wire means for conducting electrical signals to respective ones of said solenoid means; a single multi-contact plug secured to said closure plate means and connected with said wire means; a plurality of flow transfer passages in fluid communication with a portion of said fluid passages for conducting fluid flow as directed by said valve means, said flow transfer passages being alignable with said passages in said housing so that flow therebetween is perpendicular only to said closure plate means and said multi-contact plug being connectible with a mating plug on said housing; and means for securing said valve and closure assembly with said housing to maintain said plugs in mating connection and said transfer flow passages in flow registration with the passages in said housing to permit controlling of said hydraulically controlled elements and for closing said opening in said housing.

2. A valve and closure assembly for a transmission wherein the transmission includes a housing with an opening therein said housing enclosing a plurality of hydraulically controlled elements such as fluid-operated friction devices and a fluid pump and said housing also having formed therein passages accepting fluid flow only in a direction perpendicular to said opening for distributing fluid to said friction devices and for lubrication and cooling and the transmission also including a plurality of electronic sensors such as speed sensors disposed in the housing, said valve and closure assembly comprising: closure plate means providing the sole element for closing said opening in the housing including a plurality of fluid passages formed therein and fluid filter support means formed therein; valve assembly means secured to said closure plate means and enclosing said fluid passages and including a separator plate and a plurality of valve means for controlling the flow of fluid in said passage means; solenoid means for operating said valve means including a plurality of wire means for conducting electrical signals to respective ones of said solenoid means; a single multi-contact plug secured to said closure plate means and connected with said wire means; a plurality of flow transfer passages in fluid communication with a portion of said fluid passages for conducting fluid flow as directed by said valve means only in a direction perpendicular to said closure plate means, said flow transfer passages being alignable with said passages in said housing and said multi-contact plug being connectible with a mating plug on said housing; fluid filter means disposed in said support means for filtering fluid prior to delivery from said fluid pump and after return from lubrication; and means for securing said valve and closure assembly with said housing to maintain said plugs in mating connection and said transfer flow passages in flow registration with the passages in said housing to permit controlling of said hydraulically controlled elements and for closing said opening in said housing.

* * * * *